(12) United States Patent
Chen et al.

(10) Patent No.: US 12,571,425 B2
(45) Date of Patent: Mar. 10, 2026

(54) SLIDE RAIL ASSEMBLY

(71) Applicants: King Slide Works Co., Ltd., Kaohsiung City (TW); King Slide Technology Co., Ltd., Kaohsiung City (TW)

(72) Inventors: Ken-Ching Chen, Kaohsiung City (TW); Shun-Ho Yang, Kaohsiung City (TW); Wei-Chen Chang, Kaohsiung City (TW); Chun-Chiang Wang, Kaohsiung City (TW)

(73) Assignees: King Slide Works Co., Ltd., Kaohsiung City (TW); King Slide Technology Co., Ltd., Kaohsiung City (TW)

( * ) Notice: Subject to any disclaimer, the term of this patent is extended or adjusted under 35 U.S.C. 154(b) by 98 days.

(21) Appl. No.: 18/626,018

(22) Filed: Apr. 3, 2024

(65) Prior Publication Data

US 2025/0137488 A1 May 1, 2025

(30) Foreign Application Priority Data

Oct. 30, 2023 (TW) ................................. 112141760

(51) Int. Cl.
*F16C 29/10* (2006.01)
*A47B 88/423* (2017.01)
(Continued)

(52) U.S. Cl.
CPC ............ *F16C 29/10* (2013.01); *A47B 88/423* (2017.01); *E05C 3/22* (2013.01); *F16C 29/02* (2013.01); *A47B 2210/0016* (2013.01)

(58) Field of Classification Search
CPC ........ F16C 29/10; F16C 29/02; A47B 88/423; A47B 2210/0016; A47B 88/50; A47B 2088/4235; E05C 3/22
See application file for complete search history.

(56) References Cited

U.S. PATENT DOCUMENTS 6,883,884 B2 * 4/2005 Chen .................... A47B 88/423
312/334.44
7,798,581 B2 * 9/2010 Chen ...................... G06F 1/183
312/334.4
(Continued)

FOREIGN PATENT DOCUMENTS

EP 4002967 A1 5/2022

*Primary Examiner* — Hanh V Tran
(74) *Attorney, Agent, or Firm* — Best & Flanagan LLP

(57) ABSTRACT

A slide rail assembly includes a first rail, a second rail, a blocking feature, two operating members and a locking member. The second rail and the first rail are movable relative to each other. The blocking feature is arranged on the first rail. The two operating members and the locking member are movably mounted on the second rail. When the second rail is located at a predetermined position relative to the first rail and when the locking member is in a locking state, the locking member and the blocking feature are configured to block each other to prevent the second rail from being moved away from the predetermined position. When one of the two operating members is operated, the locking member is configured to be driven to move from the locking state to an unlocking state to allow the second rail to be moved away from the predetermined position.

17 Claims, 11 Drawing Sheets

(51) Int. Cl.
    *E05C 3/22*                (2006.01)
    *F16C 29/02*             (2006.01)

(56)                References Cited

U.S. PATENT DOCUMENTS

| | | | | |
|---|---|---|---|---|
| 8,220,879 | B2 * | 7/2012 | Chen | A47B 88/46 |
| | | | | 312/334.47 |
| 8,317,278 | B2 * | 11/2012 | Enos | A47B 88/493 |
| | | | | 312/334.47 |
| 9,867,462 | B2 * | 1/2018 | Chen | A47B 88/427 |
| 10,098,459 | B2 * | 10/2018 | Chen | A47B 96/067 |
| 10,349,742 | B2 * | 7/2019 | Chen | H02B 1/36 |
| 10,443,271 | B1 * | 10/2019 | Rose | E05C 3/16 |
| 10,588,409 | B2 * | 3/2020 | Chen | A47B 96/06 |
| 10,641,010 | B2 * | 5/2020 | Sonney | A47B 88/944 |
| 10,869,404 | B2 * | 12/2020 | Yu | H05K 7/1489 |
| 10,939,573 | B1 * | 3/2021 | Liao | H01R 13/62983 |
| 11,197,389 | B2 * | 12/2021 | Lin | A47B 88/437 |
| 11,382,233 | B2 * | 7/2022 | Chang | H05K 7/1489 |
| 2021/0212462 | A1 * | 7/2021 | Milligan | A47B 88/53 |
| 2022/0160127 | A1 * | 5/2022 | Chen | A47B 88/423 |
| 2022/0369478 | A1 * | 11/2022 | Li | H05K 7/20272 |
| 2024/0188716 | A1 * | 6/2024 | Chen | A47B 88/49 |
| 2024/0240669 | A1 * | 7/2024 | Chen | A47B 88/423 |
| 2025/0120506 | A1 * | 4/2025 | Chen | H05K 7/1489 |

* cited by examiner

SLIDE RAIL ASSEMBLY

BACKGROUND OF THE INVENTION

1. Field of the Invention

The present invention relates to a slide rail mechanism, and more particularly, to a slide rail assembly capable of unlocking two slide rails from each other at a predetermined position through operating one of two operating members.

2. Description of the Prior Art

U.S. Pat. No. 6,883,884 B2 discloses a latch assembly for a slide rail device. The slide rail device comprises a first rail and a second rail movable relative to each other. The first rail is arranged with a latch assembly, and the second rail is arranged with a latch base. When the first rail is located at a retracted position relative to the second rail, the latch assembly is engaged with the latch base, such that the first rail is held at the retracted position. When a user is going to unlock the latch assembly, the user must simultaneously press two actuating members of the latch assembly, such that hooks of two corresponding unlocking members are no longer engaged with the latch base in order to allow the first rail to be moved away from the retracted position relative to the second rail.

However, for different market requirements, it is important to develop a slide rail product capable of unlocking two slide rails relative to each other without requiring simultaneous operation of two actuating members (or operating members).

SUMMARY OF THE INVENTION

The present invention provides a slide rail assembly capable of unlocking two slide rails relative to each other at a predetermined position through operating one of two operating members.

According to an embodiment of the present invention, a slide rail assembly comprises a first rail, a second rail, a blocking feature, two operating members, a locking member and a driving member. The second rail and the first rail are movable relative to each other. The blocking feature is arranged on the first rail. The two operating members, the locking member and the driving member are movably mounted on the second rail. When the second rail is located at a predetermined position relative to the first rail and when the locking member is in a locking state, the locking member and the blocking feature are configured to block each other in order to prevent the second rail from being moved away from the predetermined position. When one of the two operating members is operated, the driving member is configured to be driven to move the locking member to switch from the locking state to an unlocking state, such that the locking member and the blocking feature no longer block each other, in order to allow the second rail to be moved from the predetermined position.

According to an embodiment of the present invention, a slide rail assembly comprises a first rail, a second rail, a blocking feature and two operating members. The second rail is movable relative to the first rail. The blocking feature is arranged on the first rail. The two operating members and the locking member are movably mounted on the second rail. When the second rail is located at a predetermined position relative to the first rail and when the locking member is in a locking state, the locking member and the blocking feature are configured to block each other in order to prevent the second rail from being moved away from the predetermined position. The slide rail assembly further comprises a handle movable relative to the second rail. When the second rail is located at the predetermined position relative to the first rail and when the handle is moved from a first operating position to a second operating position, the handle is configured to drive one of the two operating members to move the locking member to switch from the locking state to an unlocking state in order to allow the second rail to be moved away from the predetermined position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
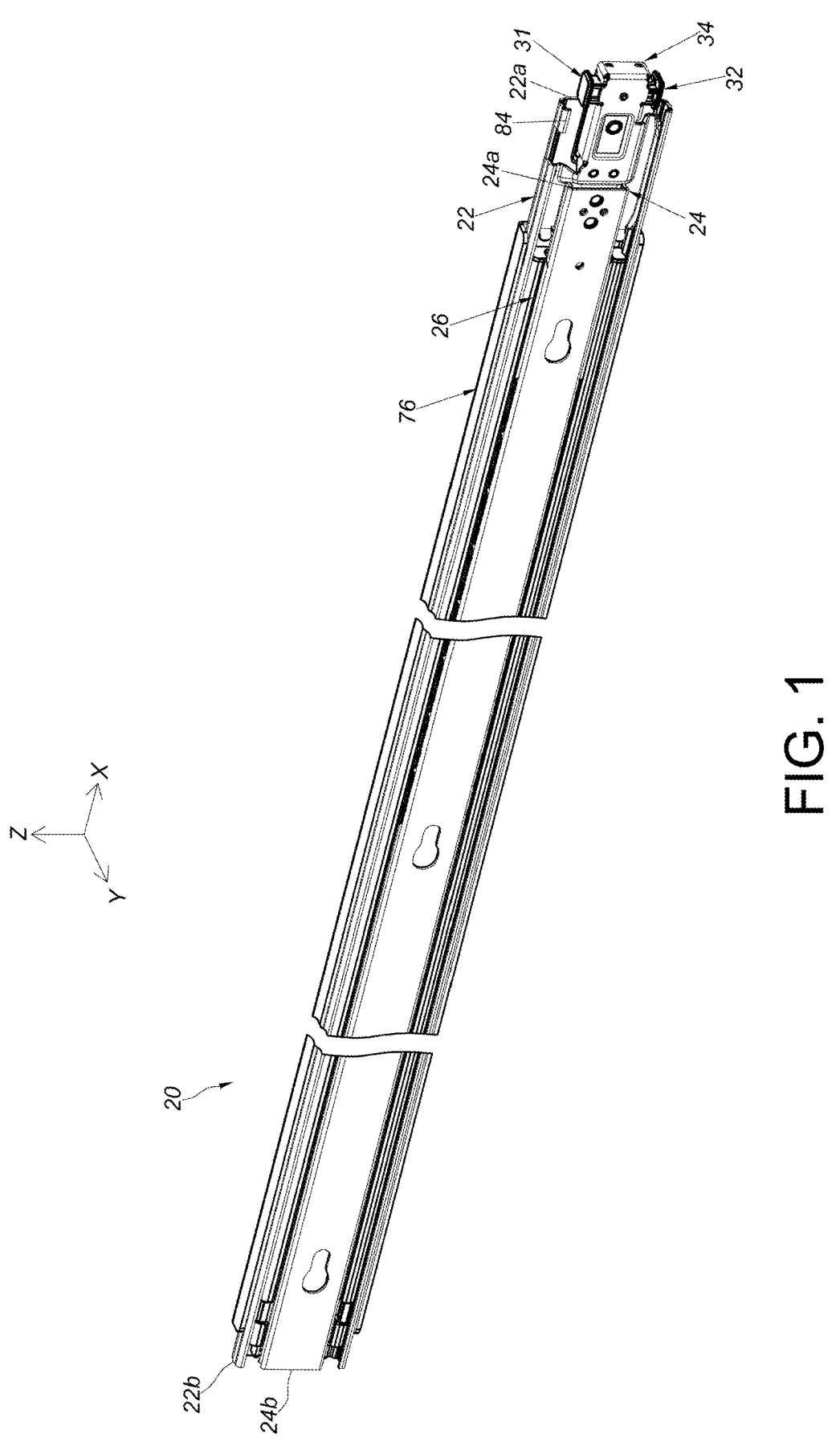
FIG. 1 is a diagram showing a slide rail assembly at least comprising a first rail and a second rail according to an embodiment of the present invention.
Figure 2:
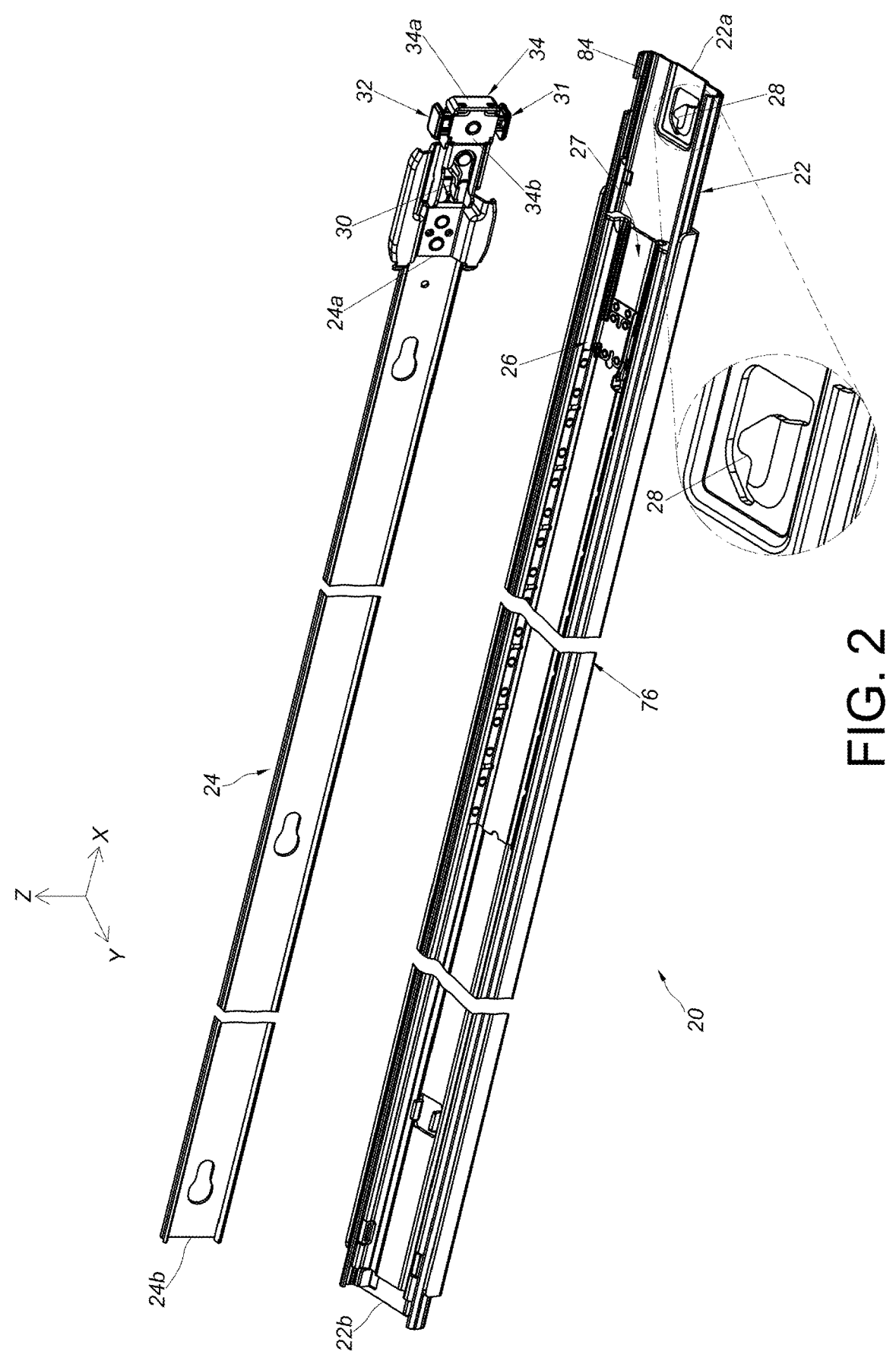
FIG. 2 is an exploded view of the first rail and the second rail of the slide rail assembly according to an embodiment of the present invention.
Figure 3:
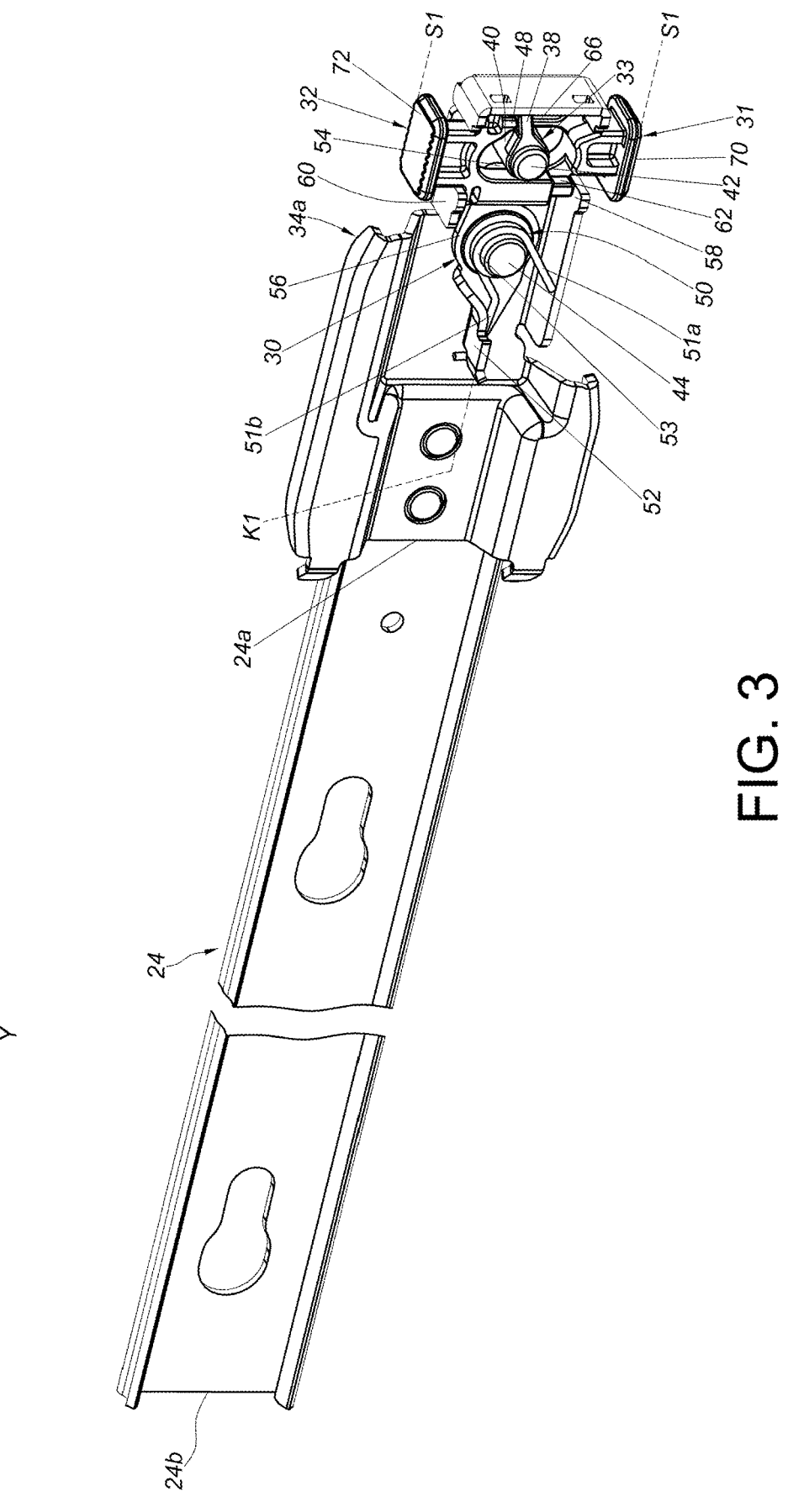
FIG. 3 is a diagram showing the second rail arranged with two operating members according to an embodiment of the present invention.

As shown in FIG. 1 to FIG. 3, a slide rail assembly 20 comprises a first rail 22 and a second rail 24 longitudinally movable relative to each other according to an embodiment of the present invention. Preferably, the slide rail assembly 20 further comprises a third rail 26 movably mounted between the first rail 22 and the second rail 24. The third rail 26 is formed with a passage 27 configured to movably mount the second rail 24. In the present embodiment, the X-axis is a longitudinal direction (or a length direction of the slide rail), the Y-axis is a transverse direction (or a lateral direction of the slide rail), and the Z-axis is a vertical direction (or a height direction of the slide rail).

Furthermore, the slide rail assembly 20 further comprises a blocking feature 28, a locking member 30 and two operating members (such as a first operating member 31 and a second operating member 32). The locking member 30 is configured to interact with the blocking feature 28.

The blocking feature 28 is arranged on one of the first rail 22 and the second rail 24. In the present embodiment, the blocking feature 28 is arranged on the first rail 22 (as shown in FIG. 2), but the present invention is not limited thereto. The blocking feature 28 can be directly or indirectly arranged on the first rail 22. In the present embodiment, the blocking feature 28 is a wall around a groove or a hole; or in an alternative embodiment, the blocking feature 28 can be a protrusion, but the present invention is not limited thereto. Preferably, the first rail 22 has a first end part 22a and a second end part 22b opposite to each other, such as a front end part and a rear end part. The blocking feature 28 is arranged on the first rail 22 and adjacent to the first end part 22a of the first rail 22.

The locking member 30, the first operating member 31 and the second operating member 32 are movably mounted on the other one of the first rail 22 and the second rail 24. In the present embodiment, the locking member 30, the first operating member 31 and the second operating member 32 are movably mounted on the second rail 24. Preferably, the second rail 24 has a first end part 24a and a second end part 24b opposite to each other, such as a front end part and a rear end part. The locking member 30, the first operating member 31 and the second operating member 32 are movably mounted on the second rail 24 and adjacent to the first end part 24a of the second rail 24.

Preferably, the slide rail assembly 20 further comprises a driving member 33 movably mounted on the other one of the first rail 22 and the second rail 24. Furthermore, the driving member 33 is movably mounted on the second rail 24, such as movably mounted on the second rail 24 and adjacent to the first end part 24a of the second rail 24 (as shown in FIG. 3).

Preferably, the second rail 24 is arranged with a housing 34 (as shown in FIG. 2). The housing 34 is connected (such as fixed) to the second rail 24 and adjacent to the first end part 24a of the second rail 24, such that the housing 34 can be seen as a part of the second rail 24. The housing 34 comprises a first housing part 34a and a second housing part 34b that are connected to each other (the first housing part 34a and the second housing part 34b are shown in FIG. 2, and FIG. 3 only shows the first housing part 34a). Preferably, the first housing part 34a and the second housing part 34b are detachably mounted to each other. An accommodating space is defined between the first housing part 34a and the second housing part 34b. The locking member 30, the first operating member 31, the second operating member 32 and the driving member 33 are movably arranged on the first housing part 34a on the first end part 24a of the second rail 24 (as shown in FIG. 3). Furthermore, the first housing part 34a and the second housing part 34b are configured to accommodate and/or cover the locking member 30, the first operating member 31, the second operating member 32 and the driving member 33 for protection. Or in other alternative embodiments, the locking member 30, the first operating member 31, the second operating member 32 and the driving member 33 can be directly arranged on the second rail 24 and adjacent to the first end part 24a of the second rail 24 without being arranged on the housing 34.

Figure 4:
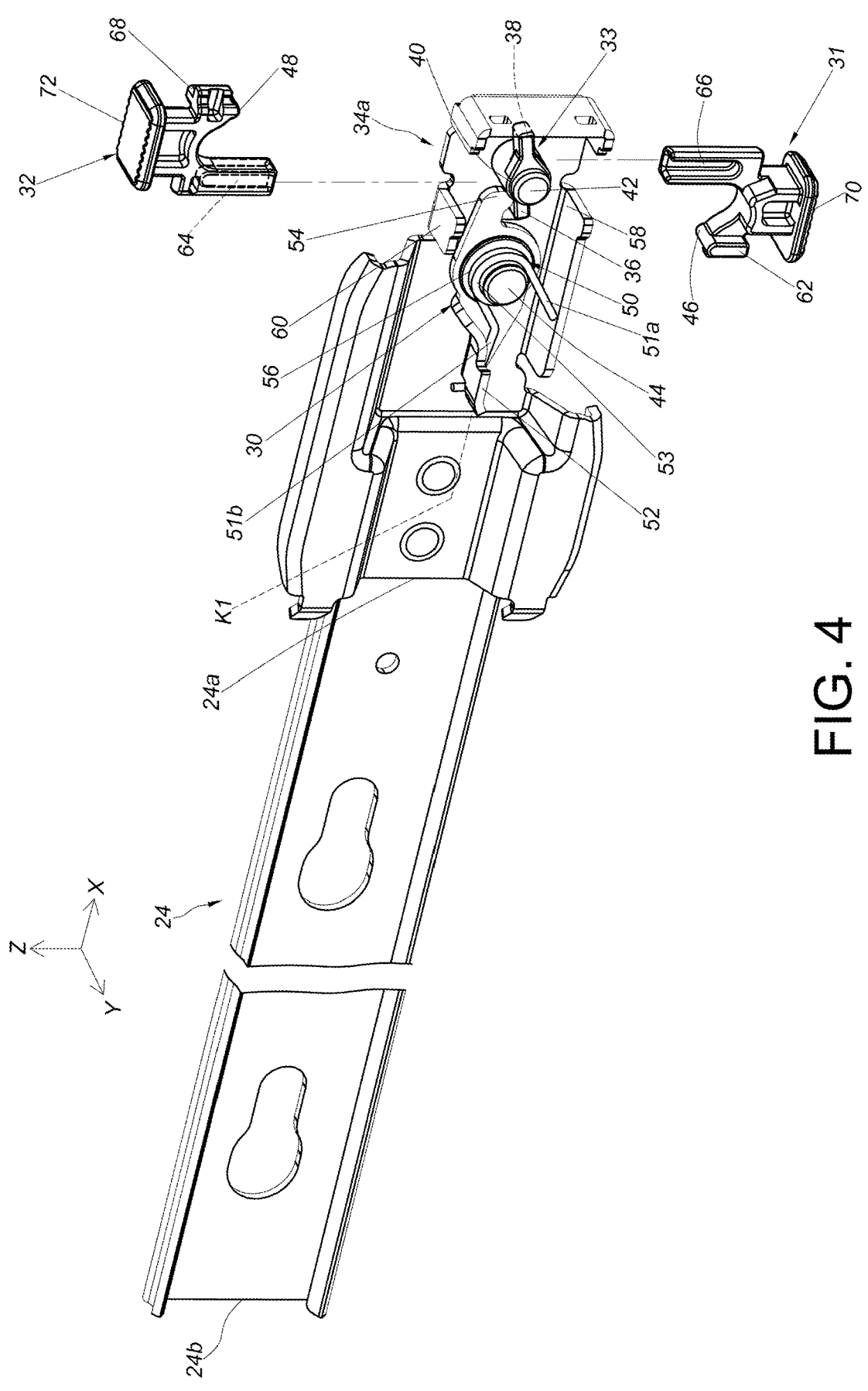
FIG. 4 is an exploded view of the second rail and the two operating members according to an embodiment of the present invention.

As shown in FIG. 3 and FIG. 4 (FIG. 4 only shows the first housing part 34a and the second housing part 34b is omitted), the driving member 33 comprises a first contact part 36, a second contact part 38 and a middle part 40 located between the first contact part 36 and the second contact part 38. The middle part 40 is pivotally connected to the second rail 24 (such as pivotally connected to the first housing part 34a on the second rail 24) through a first shaft 42.

Preferably, the locking member 30 is pivotally connected to the second rail 24 (such as pivotally connected to the first housing part 34a on the second rail 24) through a second shaft 44. The second shaft 44 and the first shaft 42 are arranged in a direction substantially identical to the transverse direction of the second rail 24 (or the lateral direction of the second rail 24, or the Y-axis direction).

Preferably, the first operating member 31 has a first corresponding feature 46 facing toward the first contact part 36 of the driving member 33, and the second operating member 32 has a second corresponding feature 48 facing toward the second contact part 38 of the driving member 33. According to such arrangement, the driving member 33 can be driven when one of the first operating member 31 and the second operating member 32 is operated.

Preferably, the slide rail assembly 20 further comprises an elastic member 50. The locking member 30 is configured to be held in a locking state K1 in response to an elastic force of the elastic member 50, and the locking member 30 in the locking state K1 is configured to abut against one of the first contact part 36 and the second contact part 38, such that the driving member 33 can hold the first operating member 31 and the second operating member 32 in a first state S1. Specifically, the locking member 30 comprises a locking part 52, an auxiliary part 54 and a middle section 56 located between the locking part 52 and the auxiliary part 54. The middle section 56 is pivotally connected to the first housing part 34a on the second rail 24 through the second shaft 44. The locking member 30 in the locking state K1 is configured to abut against the first contact part 36 through the auxiliary part 54 (as shown in FIG. 4), such that the driving member 33 can hold the first operating member 31 and the second operating member 32 in the first state S1 through the first contact part 36 and the second contact part 38 respectively contacting the first corresponding feature 46 of the first operating member 31 and the second corresponding feature 48 of the second operating member 32 (please also refer to FIG. 5).

Preferably, the elastic member 50 comprises a first elastic part 51a, a second elastic part 51b and a mounting part 53 connected between the first elastic part 51a and the second elastic part 51b. The first elastic part 51a is configured to contact the first housing part 34a on the second rail 24, the second elastic part 51b is configured to contact the locking member 30, and the mounting part 53 is mounted to the second shaft 44.

Preferably, the second rail 24 comprises at least one blocking part. In the present embodiment, the second rail 24 comprises a first blocking part 58 and a second blocking part 60, and the first blocking part 58 and the second blocking part 60 are configured to respectively block the first operating member 31 and the second operating member 32 in the first state S1 (as shown in FIG. 3).

Preferably, the first operating member 31 and the second operating member 32 respectively comprise a first guiding structure 62 and a second guiding structure 64 matching each other. A relative moving direction between the first guiding structure 62 and the second guiding structure 64 is substantially identical to a height direction of the second rail 24 (or the Z-axis direction). In the present embodiment, the first guiding structure 62 and the second guiding structure 64 are a combination of a rib and a groove, but the present invention is not limited thereto.

Preferably, the first operating member 31 and the second operating member 32 respectively comprise a third guiding structure 66 and a fourth guiding structure 68 matching each other. A relative moving direction between the third guiding structure 66 and the fourth guiding structure 68 is substantially identical to the height direction of the second rail 24 (or the Z-axis direction). In the present embodiment, the third guiding structure 66 and the fourth guiding structure 68 are a combination of a rib and a groove, but the present invention is not limited thereto.

Figure 5:
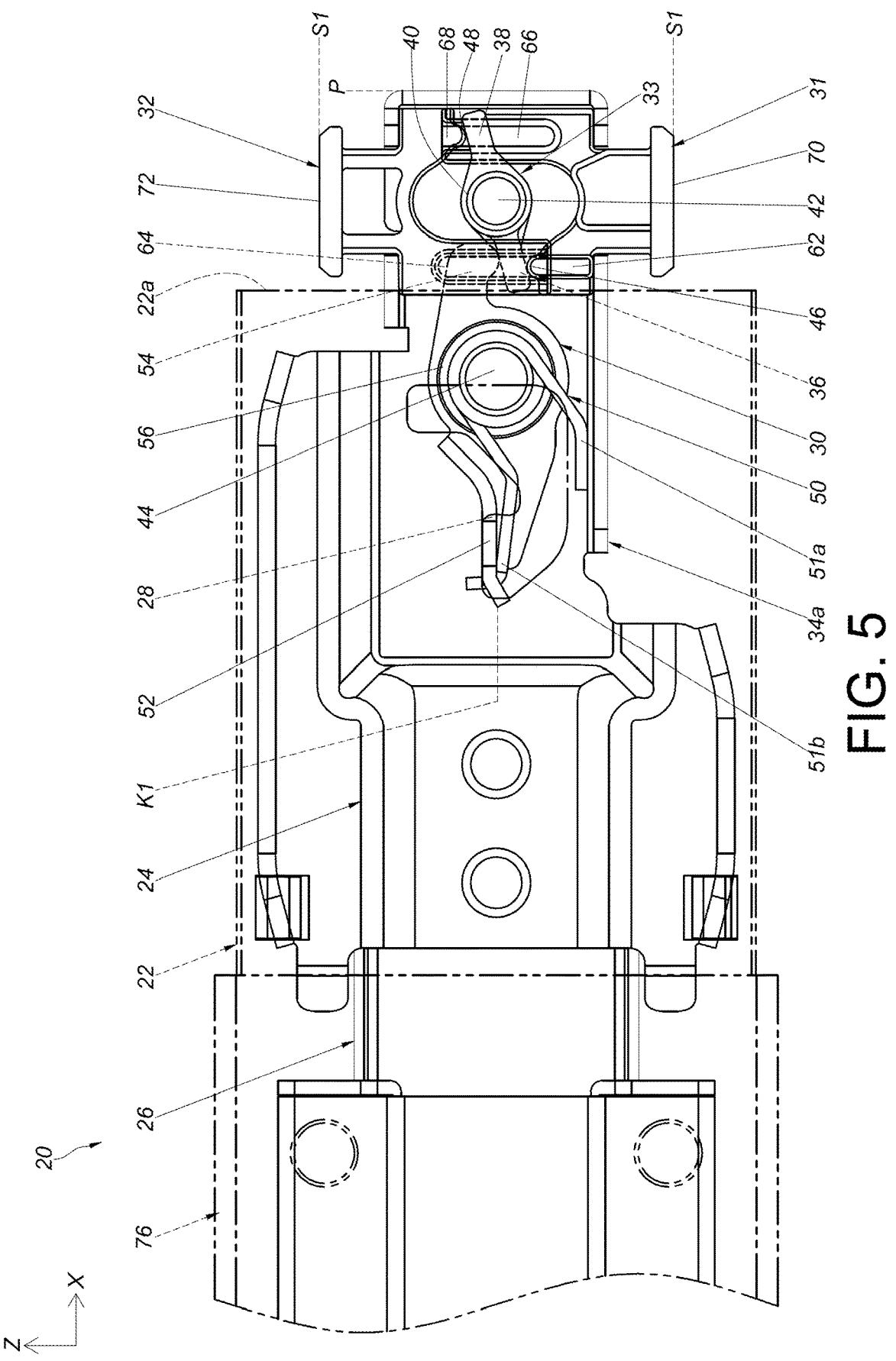
FIG. 5 is a diagram showing the second rail being locked at a predetermined position relative to the first rail according to an embodiment of the present invention.

Preferably, the first corresponding feature 46 of the first operating member 31 is located adjacent to an end part of the first guiding structure 62, and the second corresponding feature 48 of the second operating member 32 is located adjacent to an end part of the fourth guiding structure 68 (please refer to FIG. 5).

Preferably, the first operating member 31 and the second operating member 32 respectively comprise a first operating part 70 and a second operating part 72 configured to be pressed by the user. The first operating part 70 and the second operating part 72 are located at opposite positions. Specifically, the first operating part 70 is located at a first height position (close to a lower position of the second rail 24), and the second operating part 72 is located at a second height position (close to an upper position of the second rail 24).

Preferably, the first guiding structure 62 and the third guiding structure 66 are extended from the first operating part 70 of the first operating member 31, and the first guiding structure 62 and the third guiding structure 66 are spaced from each other. Similarly, the second guiding structure 64 and the fourth guiding structure 68 are extended from the second operating part 72 of the second operating member 32, and the second guiding structure 64 and the fourth guiding structure 68 are spaced from each other.

Preferably, the driving member 33 is located between the first operating member 31 and the second operating member 32.

As shown in FIG. 5, when the second rail 24 is located at a predetermined position P (such as a retracted position) relative to the first rail 22 and when the locking member 30 is in the locking state K1, the locking part 52 of the locking member 30 and the blocking feature 28 of the first rail 22 are configured to block each other in order to prevent the second rail 24 from being moved away from the predetermined position P. Specifically, when the locking member 30 is in the locking state K1, the blocking feature 28 is located on a moving path of the locking part 52 along the longitudinal direction, such that the locking part 52 and the blocking feature 28 are configured to block each other.

Figure 6:
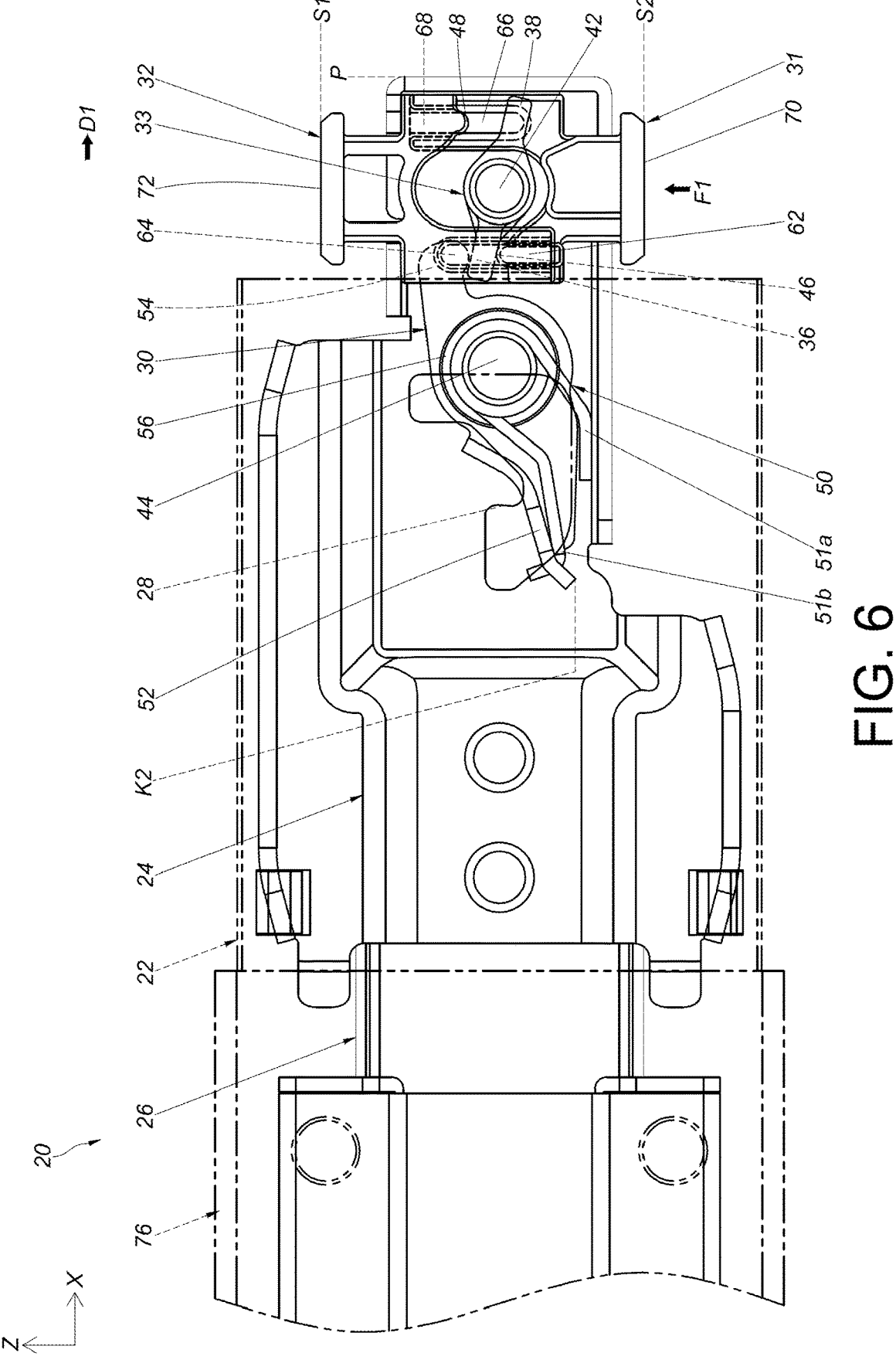
FIG. 6 is a diagram showing a user operating a first operating member to unlock the second rail when the second rail is locked at the predetermined position relative to the first rail according to an embodiment of the present invention.

As shown in FIG. 5 and FIG. 6, when one of the first operating member 31 and the second operating member 32 (such as the first operating member 31) is operated, the locking member 30 is configured to be driven to move from the locking state K1 (as shown in FIG. 5) to an unlocking state K2 (as shown in FIG. 6), so as to allow the second rail 24 to be moved away from the predetermined position P. For example, the second rail 24 is movable from the predetermined position P along a predetermined direction D1.

Preferably, when the first operating member 31 is operated, the driving member 33 is configured to be driven to move accordingly (for example, the driving member 33 is configured to be rotated a predetermined angle), such that the driving member 33 can drive the locking member 30 to move to switch from the locking state K1 (as shown in FIG. 5) to the unlocking state K2 (as shown in FIG. 6) in order to allow the second rail 24 to be moved away from the predetermined position P.

Preferably, the first corresponding feature 46 of the first operating member 31 faces toward the first contact part 36 of the driving member 33 in a first predetermined direction (such as an upward direction). On the other hand, the second corresponding feature 48 of the second operating member 32 faces toward the second contact part 38 of the driving member 33 in a second predetermined direction (such as a downward direction) opposite to the first predetermined direction.

Furthermore, the user can apply a first force F1 to one of the first operating member 31 (the first operating part 70 of the first operating member 31) and the second operating member 32 (the second operating part 72 of the second operating member 32). For example, the user can apply the first force F1 to the first operating member 31 (the first operating part 70 of the first operating member 31), to press the first operating member 31 to move from the first state S1 (as shown in FIG. 5) to a second state S2 (as shown in FIG. 6). During such process, the first corresponding feature 46 of the first operating member 31 is configured to contact (such as push) the first contact part 36 of the driving member 33 to move the driving member 33, and the driving member 33 further drives the locking member 30 to move from the locking state K1 (as shown in FIG. 5) to the unlocking state K2 (as shown in FIG. 6) in order to allow the second rail 24 to be moved from the predetermined position P along the predetermined direction D1. When the locking member 30 is in the unlocking state K2, the blocking feature 28 is no longer located on the moving path of the locking part 52 along the longitudinal direction (for example, the locking part 52 and the blocking feature 28 are not aligned with each other along the longitudinal direction as shown in FIG. 6), such that the locking part 52 and the blocking feature 28 no longer block each other in order to allow the second rail 24 to be moved from the predetermined position P along the predetermined direction D1. In addition, when the locking member 30 is in the unlocking state K2 (as shown in FIG. 6), the elastic member 50 is in a state of accumulating an elastic force.

During a process of the first operating member 31 being moved by the first force F1 to switch from the first state S1 (as shown in FIG. 5) to the second state S2 (as shown in FIG. 6), the first guiding structure 62 of the first operating member 31 and the second guiding structure 64 of the second operating member 32 are movable relative to each other; and the third guiding structure 66 of the first operating member 31 and the fourth guiding structure 68 of the second operating member 32 are movable relative to each other. In other words, when the first operating member 31 is moved from the first state S1 (as shown in FIG. 5) to the second state S2 (as shown in FIG. 6), the second operating member 32 is not driven to move accordingly.

Moreover, when the locking member 30 is in the unlocking state K2 (as shown in FIG. 6), the second rail 24 is movable relative to the first rail 22 along the predetermined direction D1 from the predetermined position P to another predetermined position (such as an open position not shown figures). Once the user stops applying the first force F1 to the first operating member 31 (the first operating part 70 of the first operating member 31), the locking member 30 is configured to return to the locking state K1 (as shown in FIG. 5) from the unlocking state K2 (as shown in FIG. 6) in response to the elastic force of the elastic member 50, and the locking member 30 in the locking state K1 is configured to abut against the first contact part 36, such that the driving member 33 is configured to contact the first corresponding feature 46 through the first contact part 36 in order to hold the first operating member 31 in the first state S1 again (as shown in FIG. 5).

Figure 7:
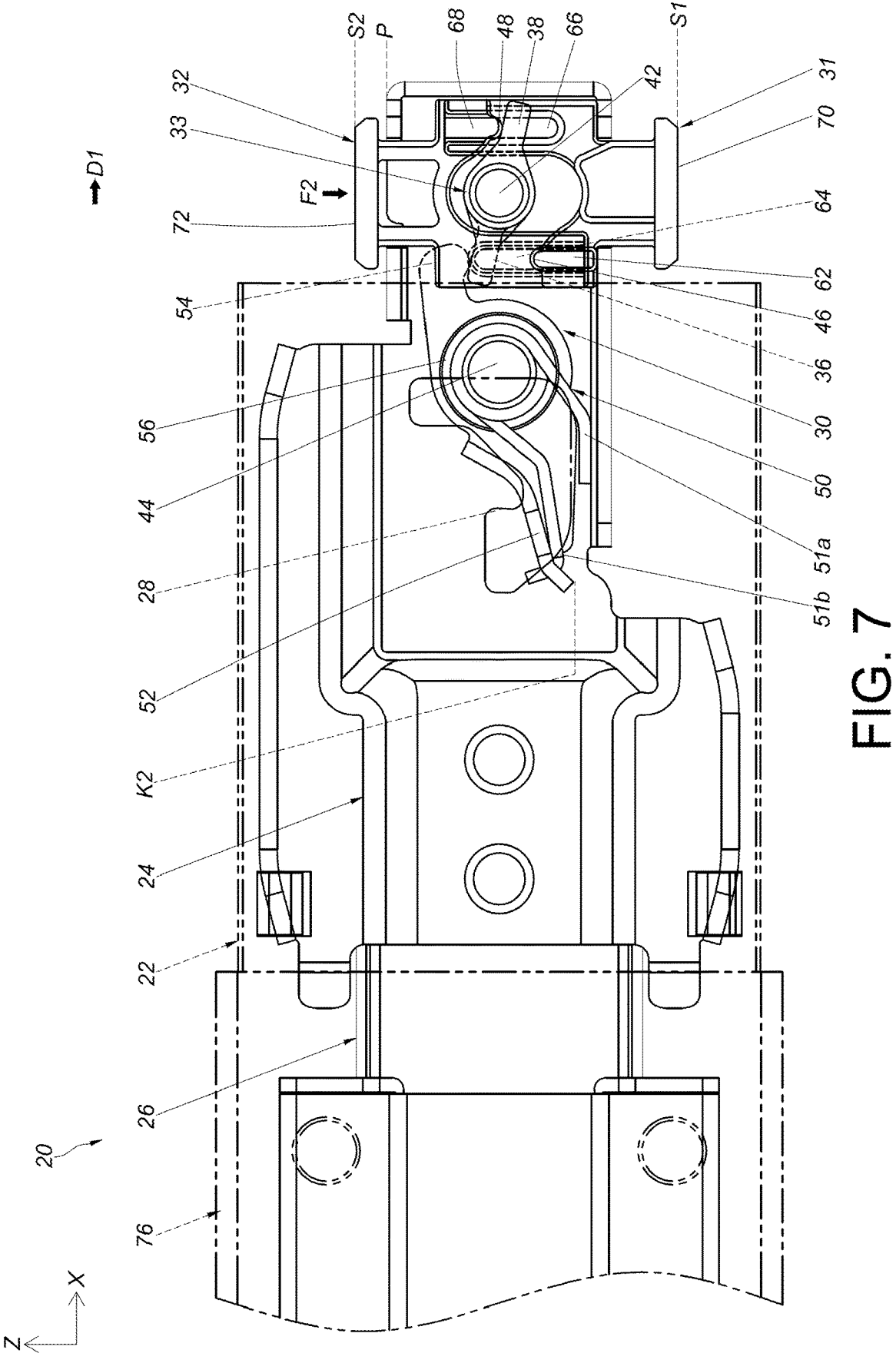
FIG. 7 is a diagram showing the user operating a second operating member to unlock the second rail when the second rail is locked at the predetermined position relative to the first rail according to an embodiment of the present invention.

As shown in FIG. 5 and FIG. 7, when the second operating member 32 is operated, the locking member 30 can also be driven to move from the locking state K1 (shown in FIG. 5) to the unlocking state K2 (shown in FIG. 7) so as to allow the second rail 24 to be moved away from the predetermined position P. For example, the second rail 24 is movable from the predetermined position P along the predetermined direction D1.

Preferably, when the second operating member 32 is operated, the driving member 33 is configured to be driven to move accordingly (for example, the driving member 33 is configured to be rotated a predetermined angle), such that the driving member 33 can drive the locking member 30 to move to switch from the locking state K1 (as shown in FIG. 5) to the unlocking state K2 (as shown in FIG. 7) in order to allow the second rail 24 to be moved away from the predetermined position P.

Furthermore, the user can apply a second force F2 (opposite to the first force F1) to the second operating member 32 (the second operating part 72 of the second operating member 32), so as to press the second operating member 32 to move from the first state S1 (as shown in FIG. 5) to the second state S2 (as shown in FIG. 7). During such process, the second corresponding feature 48 of the second operating member 32 is configured to contact (such as push) the second contact part 38 of the driving member 33 to move the driving member 33, and the driving member 33 further drives the locking member 30 to move from the locking state K1 (as shown in FIG. 5) to the unlocking state K2 (as shown in FIG. 7) in order to allow the second rail 24 to be moved from the predetermined position P along the predetermined direction D1. When the locking member 30 is in the unlocking state K2, the blocking feature 28 is no longer located on the moving path of the locking part 52 along the longitudinal direction (for example, the locking part 52 and the blocking feature 28 are not aligned with each other along the longitudinal direction as shown in FIG. 7), such that the locking part 52 and the blocking feature 28 no longer block each other in order to allow the second rail 24 to be moved from the predetermined position P along the predetermined direction D1. In addition, when the locking member 30 is in the unlocking state K2 (as shown in FIG. 7), the elastic member 50 is in a state of accumulating the elastic force.

During a process of the second operating member 32 being moved by the second force F2 to switch from the first state S1 (as shown in FIG. 5) to the second state S2 (as shown in FIG. 7), the first guiding structure 62 of the first operating member 31 and the second guiding structure 64 of the second operating member 32 are movable relative to each other; and the third guiding structure 66 of the first operating member 31 and the fourth guiding structure 68 of the second operating member 32 are movable relative to each other. In other words, when the second operating member 32 is moved from the first state S1 (as shown in FIG. 5) to the second state S2 (as shown in FIG. 7), the first operating member 31 is not driven to move accordingly.

Moreover, when the locking member 30 is in the unlocking state K2 (as shown in FIG. 7), the second rail 24 is movable relative to the first rail 22 along the predetermined direction D1 from the predetermined position P to another predetermined position (such as the open position not shown figures). Once the user stops applying the second force F2 to the second operating member 32 (the second operating part 72 of the second operating member 32), the locking member 30 is configured to return to the locking state K1 (as shown in FIG. 5) from the unlocking state K2 (as shown in FIG. 7) in response to the elastic force of the elastic member 50, and the locking member 30 in the locking state K1 is configured to abut against the first contact part 36, such that the driving member 33 is configured to contact the second corresponding feature 48 through the second contact part 38 in order to hold the second operating member 32 in the first state S1 again (as shown in FIG. 5).

Therefore, the user can operate the first operating member 31 or the second operating member 32 to unlock the second rail 24 from the first rail 22 at the predetermined position P, so as to allow the second rail 24 to be moved away from the predetermined position P.

Figure 8:
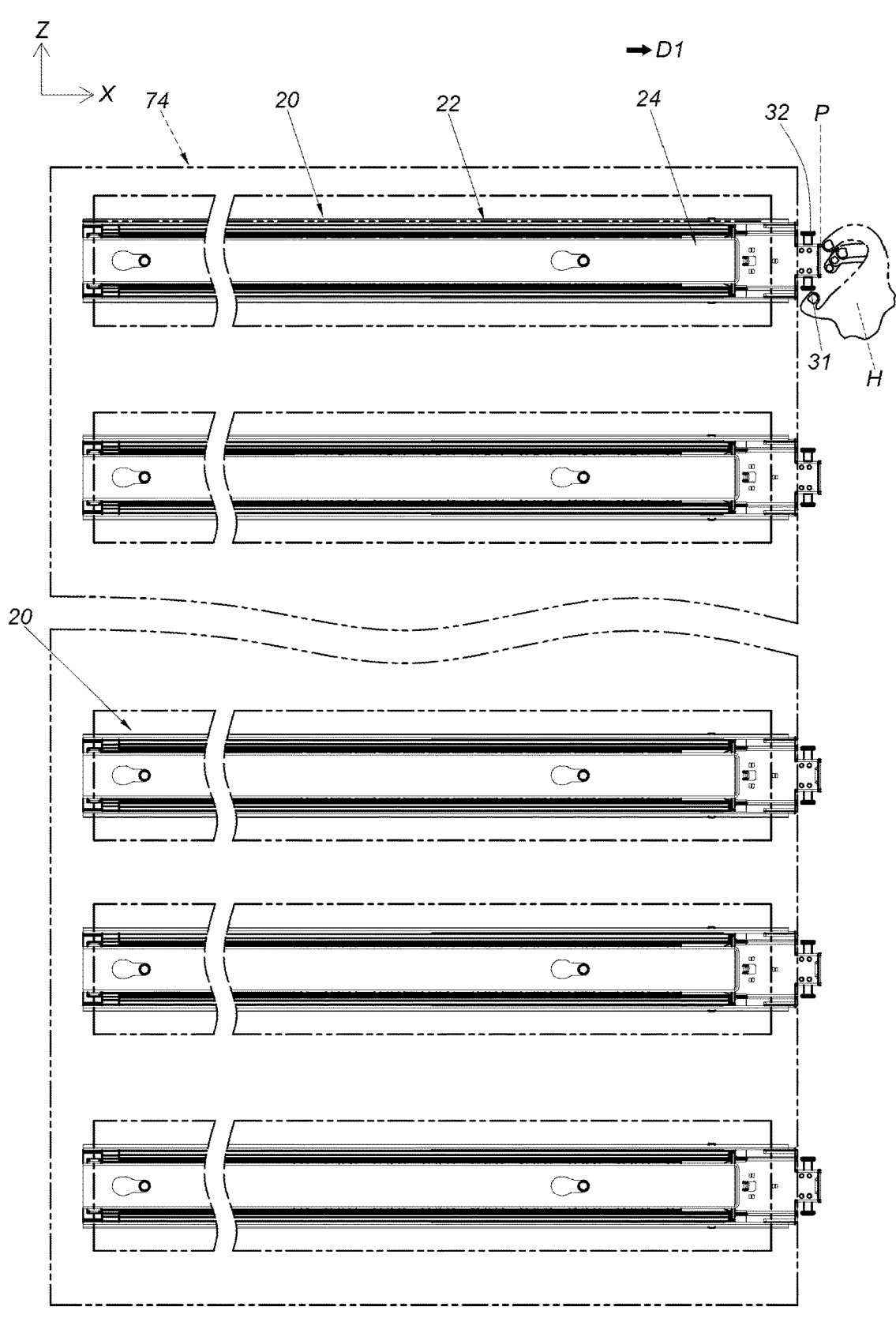
FIG. 8 is a diagram showing a plurality of slide rail assemblies mounted to a rack, and the user operating the first operating member to unlock the second rail from the first rail of the highest slide rail assembly according to an embodiment of the present invention.

As shown in FIG. 8, a plurality of slide rail assemblies 20 are mounted on a rack 74 (or a cabinet) along the height direction (such as the Z-axis direction), and the slide rail assemblies 20 have substantially the same structural configuration. Furthermore, when the user is going to operate the slide rail assembly 20 mounted at the highest position of the rack 74 with the second rail 24 being locked at the predetermined position P relative to the first rail 22, it is difficult for the user's hand H to reach and operate the second operating member 32 (the second operating part 72 of the second operating member 32) of the slide rail assembly 20 at the highest position. Therefore, the user can operate the first operating member 31 (the first operating part 70 of the first operating member 31) to drive the locking member 30 to switch from the locking state K1 (please also refer to FIG. 5) to the unlocking state K2 (please also refer to FIG. 6), in order to allow the second rail 24 of the slide rail assembly 20 at the highest position to be moved from the predetermined position P along the predetermined direction D1. Such configuration has been disclosed above, for simplification, no further illustration is provided.

Figure 9:
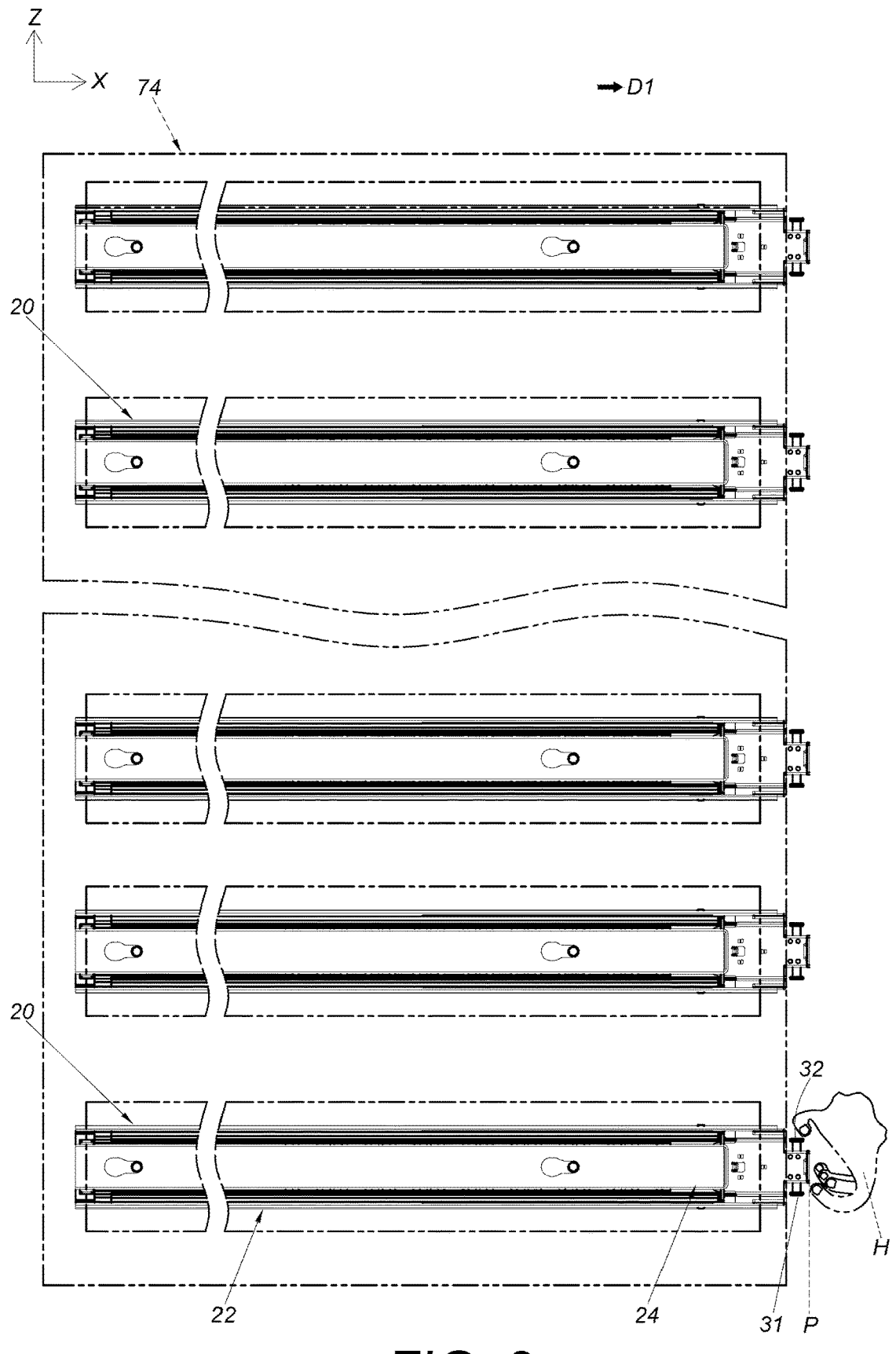
FIG. 9 is a diagram showing the plurality of slide rail assemblies mounted to a rack, and the user operating the second operating member to unlock the second rail from the first rail of the lowest slide rail assembly according to an embodiment of the present invention.

As shown in FIG. 9, when the user is going to operate the slide rail assembly 20 mounted at the lowest position of the rack 74 with the second rail 24 being locked at the predetermined position P relative to the first rail 22, it is difficult for the user's hand H to reach and operate the first operating member 31 (the first operating part 70 of the first operating member 31) of the slide rail assembly 20 at the lowest position. Therefore, the user can operate the second operating member 32 (the second operating part 72 of the second operating member 32) to drive the locking member 30 to switch from the locking state K1 (please also refer to FIG. 5) to the unlocking state K2 (please also refer to FIG. 7), in order to allow the second rail 24 of the slide rail assembly 20 at the lowest position to be moved from the predetermined position P along the predetermined direction D1. Such configuration has been disclosed above, for simplification, no further illustration is provided.

Figure 10:
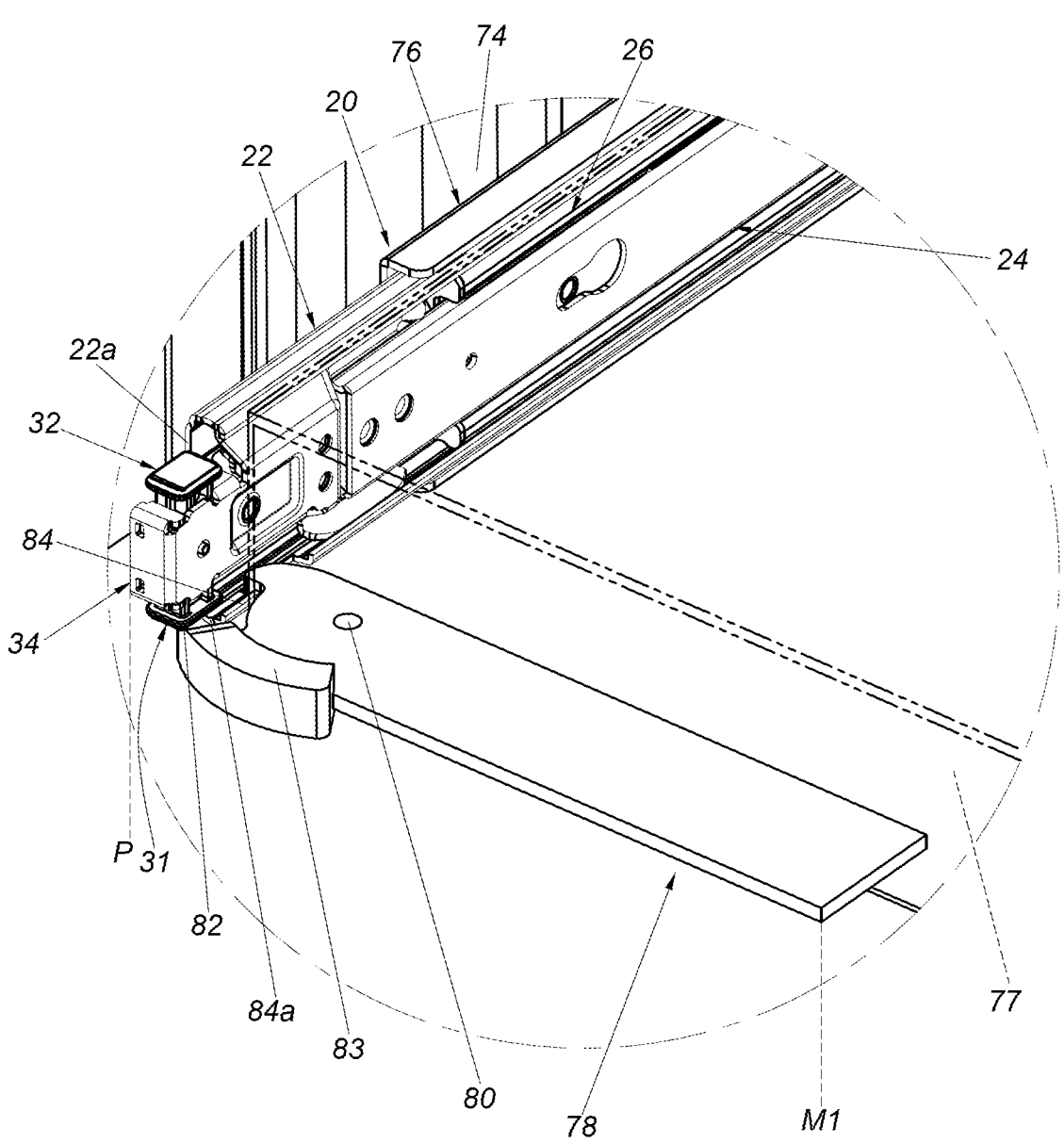
FIG. 10 is a diagram showing the slide rail assembly mounted to a rack, and the slide rail assembly being configured to interact with a handle according to an embodiment of the present invention.

As shown in FIG. 10, the first rail 22 is arranged with a bracket 76, and the bracket 76 and the first rail 22 are connected to each other and can be seen as one piece.

Preferably, the first rail 22 is configured to be mounted to the rack 74 through the bracket 76. The second rail 24 is locked at the predetermined position P relative to the first rail 22, and the second rail 24 is configured to carry a carried object 77 (such as a chassis, a drawer or the like). Furthermore, the carried object 77 is mounted (such as fixed) to the second rail 24 and can be seen as a portion of the second rail 24. Such configuration is well known to those skilled in the art, for simplification, no further illustration is provided.

The slide rail assembly 20 further comprises a handle 78. The handle 78 is movable relative to the second rail 24. In the present embodiment, the handle 78 is pivotally connected to the carried object 77 (a bottom of the carried object 77) through an auxiliary shaft 80, so that the handle 78 is rotatable relative to the second rail 24. Alternatively, the second rail 24 comprises a predetermined structure, and the handle 78 is pivotally connected to the predetermined structure of the second rail 24 directly, such that the handle 78 is rotatable relative to the second rail 24.

Figure 11:
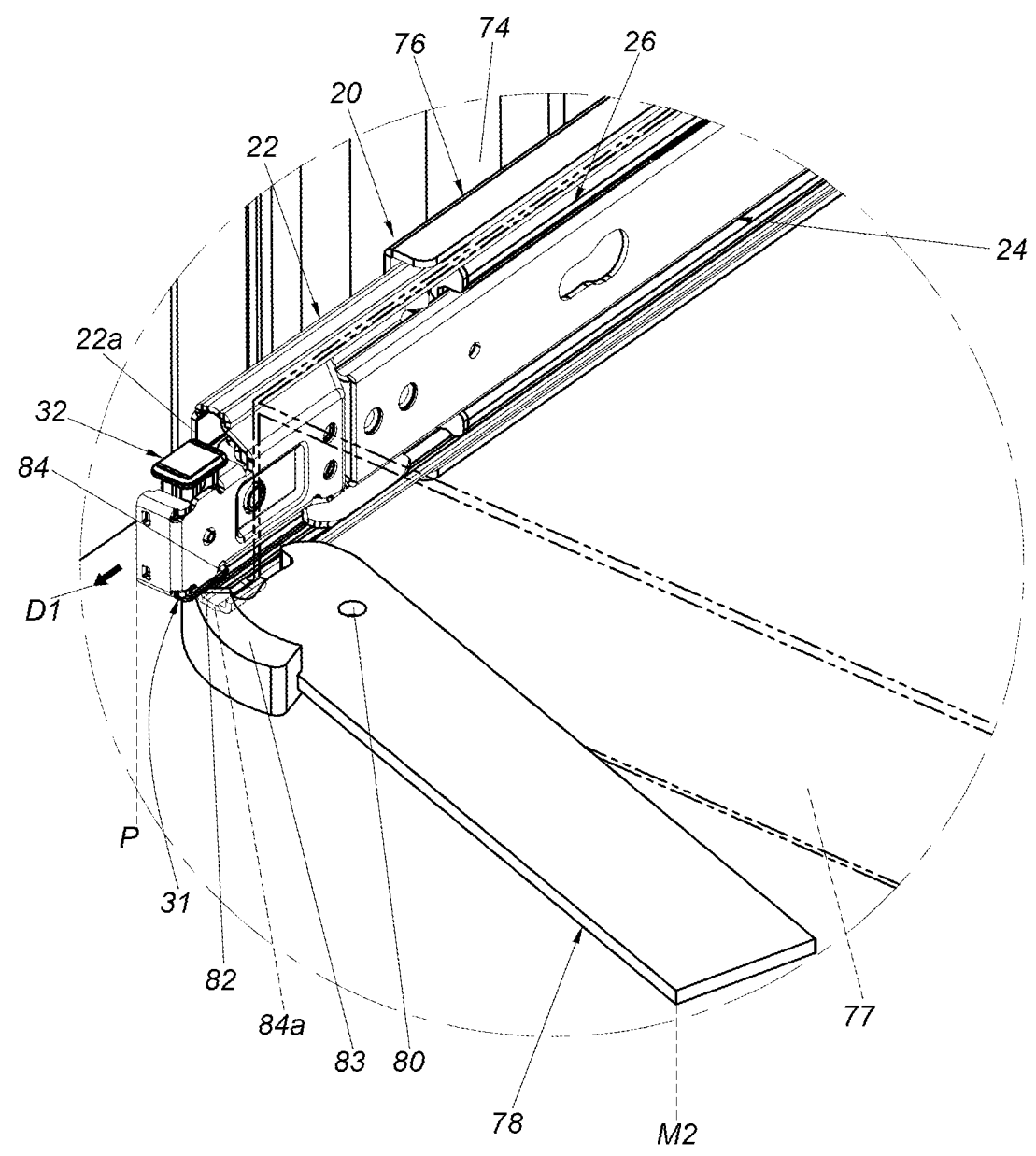
FIG. 11 is a diagram showing the slide rail assembly mounted to the rack, and the second rail being unlocked from the first rail at the predetermined position through the handle according to an embodiment of the present invention.

As shown in FIG. 10 and FIG. 11, when the second rail 24 is located at the predetermined position P relative to the first rail 22, the user can operate the handle 78 to move (such as rotate) from a first operating position M1 (as shown in FIG. 10) to a second operating position M2 (as shown in FIG. 11). During such process, the handle 78 is configured to drive one of the first operating member 31 and the second operating member 32. For example, the handle 78 is configured to apply the first force F1 to the first operating member 31 (as shown in FIG. 11) in order to drive the locking member 30 to move from the locking state K1 (please also refer to FIG. 5) to the unlocking state K2 (please also refer to FIG. 6), so as to allow the second rail 24 to be moved away from the predetermined position P.

Preferably, one of the handle 78 and the first operating member 31 (the first operating part 70 of the first operating member 31) comprises a guiding feature 82 having an inclined surface or an arc surface. In the present embodiment, the handle 78 comprises the guiding feature 82, but the present invention is not limited thereto. The handle 78 can apply the first force F1 to the first operating member 31 more easily through the guiding feature 82, in order to drive the locking member 30 to move from the locking state K1 (please also refer to FIG. 5) to the unlocking state K2 (please also refer to FIG. 6), so as to allow the second rail 24 to be moved away from the predetermined position P.

Preferably, the handle 78 further comprises a predetermined part 83, and the predetermined part 83 is arranged with the guiding feature 82. The first rail 22 comprises a supporting feature 84. During a process of the handle 78 being moved from the first operating position M1 to the second operating position M2, the predetermined part 83 of the handle 78 is configured to contact one end 84a of the supporting feature 84 to generate an acting force (as shown in FIG. 11), in order to drive the second rail 24 to move a predetermined distance away from the predetermined position P along the predetermined direction D1.

Therefore, the handle 78 not only can unlock the second rail 24 relative to the first rail 22 at the predetermined position P, but also can contact the supporting feature 84 to generate an acting force, such that it is convenient or labor-saving for the user to pull out the second rail 24 (or the carried object 77) relative to the first rail 22 (or the rack 74) from the predetermined position P along the predetermined direction D1.

Therefore, the slide rail assembly 20 according to the embodiment of the present invention has the following technical features:

1. In the prior art, the user must press both actuating members of the latch assembly simultaneously. In the embodiments of the present invention, when the second rail 24 is located at the predetermined position P relative to the first rail 22 and when the locking member 30 is in the locking state K1, the locking member 30 and the blocking feature 28 are configured to block each other. The user only needs to operate (such as press or push) one of the first operating member 31 and the second operating member 32 to drive the locking member 30 to move from the locking state K1 to the unlocking state K2, such that the locking member 30 (the locking part 52 of the locking member 30) is no longer blocked by the blocking feature 28, in order to allow the second rail 24 to be moved away from the predetermined position P relative to the first rail 22.

2. The first operating part 70 of the first operating member 31 is configured to be pressed by the user with the first force F1 along a first direction, and the second operating part 72 of the second operating member 32 is configured to be pressed by the user with the second force F2 along a second direction opposite to the first direction. The first operating member 31 or the second operating member 32 can be used to drive the locking member 30 to move from the locking state K1 to the unlocking state K2.

3. The first operating part 70 of the first operating member 31 is located at a first height position (close to the lower position of the second rail 24), and the second operating part 72 of the second operating member 32 is located at a second height position (close to the upper position of the second rail 24).

4. The handle 78 is movable relative to the second rail 24. The user can operate the handle 78 to drive one of the first operating member 31 and the second operating member 32 to unlock the second rail 24 relative to the first rail 22 at the predetermined position P.

5. During a process of operating the handle 78 to move, the handle 78 is configured to contact the supporting feature 84 to generate an acting force, such that it is convenient or labor-saving for the user to pull out the second rail 24 (or the carried object 77) relative to the first rail 22 (or the rack 74) from the predetermined position P along the predetermined direction D1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
a first rail;
a second rail, wherein the second rail and the first rail are movable relative to each other;
a blocking feature arranged on the first rail;
two operating members movably mounted on the second rail;
a locking member movably mounted on the second rail; and
a driving member movably mounted on the second rail;
wherein when the second rail is located at a predetermined position relative to the first rail and when the locking member is in a locking state, the locking member and the blocking feature are configured to block each other in order to prevent the second rail from being moved away from the predetermined position;

wherein when one of the two operating members is operated, the driving member is configured to be driven to move the locking member to switch from the locking state to an unlocking state, such that the locking member and the blocking feature no longer block each other, in order to allow the second rail to be moved away from the predetermined position;

wherein the driving member comprises a first contact part, a second contact part and a middle part located between the first contact part and the second contact part, and the middle part is pivotally connected to the second rail; wherein the two operating members respectively have a first corresponding feature facing toward the first contact part and a second corresponding feature facing toward the second contact part, and the first corresponding feature and the second corresponding feature are configured to drive the driving member to move when one of the two operating members is operated.

2. The slide rail assembly of claim 1, wherein the second rail has a first end part and a second end part opposite to each other, and the two operating members are movably mounted on the second rail and adjacent to the first end part.

3. The slide rail assembly of claim 1, wherein the first corresponding feature faces toward the first contact part of the driving member in a first predetermined direction; the second corresponding feature faces toward the second contact part of the driving member in a second predetermined direction opposite to the first predetermined direction.

4. The slide rail assembly of claim 1, wherein the locking member is pivotally connected to the second rail, the slide rail assembly further comprises an elastic member, the locking member is configured to be held in the locking state in response to an elastic force of the elastic member; wherein the locking member in the locking state is configured to abut against one of the first contact part and the second contact part, in order to hold the two operating members in a first state through the driving member.

5. The slide rail assembly of claim 4, wherein the second rail comprises at least one blocking part configured to block the two operating members in the first state.

6. The slide rail assembly of claim 4, wherein the two operating members respectively comprise a first guiding structure and a second guiding structure matching each other.

7. The slide rail assembly of claim 6, wherein a relative moving direction between the first guiding structure and the second guiding structure is substantially identical to a height direction of the second rail.

8. The slide rail assembly of claim 7, wherein the first guide structure and the second guide structure are a combination of a rib and a groove.

9. The slide rail assembly of claim 4, wherein the two operating members respectively comprise a first operating part and a second operating part configured to be pressed by a user.

10. A slide rail assembly, comprising:
a first rail;
a second rail movable relative to the first rail;
a blocking feature arranged on the first rail;
two operating members movably mounted on the second rail; and
a locking member movably mounted on the second rail; and a driving member movably mounted on the second rail;

wherein when the second rail is located at a predetermined position relative to the first rail and when the locking member is in a locking state, the locking member and the blocking feature are configured to block each other in order to prevent the second rail from being moved away from the predetermined position;

wherein the slide rail assembly further comprises a handle movable relative to the second rail; when the second rail is located at the predetermined position relative to the first rail and when the handle is moved from a first operating position to a second operating position, the handle is configured to drive one of the two operating members to move the locking member to switch from the locking state to an unlocking state in order to allow the second rail to be moved away from the predetermined position;

wherein when one of the two operating members is operated, the driving member is configured to be driven to move the locking member to switch from the locking state to the unlocking state in order to allow the second rail to be moved away from the predetermined position;

wherein the driving member comprises a first contact part, a second contact part and a middle part located between the first contact part and the second contact part, and the middle part is pivotally connected to the second rail; wherein the two operating members respectively have a first corresponding feature facing toward the first contact part and a second corresponding feature facing toward the second contact part, and the first corresponding feature and the second corresponding feature are configured to drive the driving member to move when one of the two operating members is operated.

11. The slide rail assembly of claim 10, wherein the first rail comprises a supporting feature; wherein during the process of moving the handle from the first operating position to the second operating position, the handle is in contact with the supporting feature to drive the second rail to move away from the predetermined position along a predetermined direction.

12. The slide rail assembly of claim 10, wherein the locking member is pivotally connected to the second rail, the slide rail assembly further comprises an elastic member, the locking member is configured to be held in the locking state in response to an elastic force of the elastic member; wherein the locking member in the locking state is configured to abut against one of the first contact part and the second contact part, in order to hold the two operating members in a first state through the driving member.

13. The slide rail assembly of claim 12, wherein the second rail comprises at least one blocking part configured to block the two operating members in the first state.

14. The slide rail assembly of claim 13, wherein the two operating members respectively comprise a first guiding structure and a second guiding structure matching each other.

15. The slide rail assembly of claim 14, wherein a relative moving direction between the first guiding structure and the second guiding structure is substantially identical to a height direction of the second rail.

16. A slide rail assembly, comprising:
a first rail;
a second rail, wherein the second rail and the first rail are movable relative to each other;
a blocking feature arranged on the first rail;

two operating members movably mounted on the second rail;

a locking member movably mounted on the second rail; and a driving member movably mounted on the second rail;

wherein when the second rail is located at a predetermined position relative to the first rail and when the locking member is in a locking state, the locking member and the blocking feature are configured to block each other in order to prevent the second rail from being moved away from the predetermined position;

wherein when a first one of the two operating members is moved by a first force along a first direction, the locking member is moved to switch from the locking state to an unlocking state, such that the locking member and the blocking feature no longer block each other, in order to allow the second rail to be moved away from the predetermined position;

wherein when a second one of the two operating members is moved by a second force along a second direction opposite to the first direction, the locking member is moved to switch from the locking state to the unlocking state, such that the locking member and the blocking feature no longer block each other, in order to allow the second rail to be moved away from the predetermined position;

wherein when the two operating members are respectively operated, the driving member is configured to be driven to move the locking member to switch from the locking state to the unlocking state in order to allow the second rail to be moved away from the predetermined position;

wherein the driving member comprises a first contact part, a second contact part and a middle part located between the first contact part and the second contact part, and the middle part is pivotally connected to the second rail; wherein the two operating members respectively have a first corresponding feature facing toward the first contact part and a second corresponding feature facing toward the second contact part, and the first corresponding feature and the second corresponding feature are configured to drive the driving member to move when one of the two operating members is operated.

17. A slide rail assembly, comprising:

a first rail;

a second rail movable relative to the first rail;

a blocking feature arranged on the first rail;

two operating members movably mounted on the second rail; and a locking member movably mounted on the second rail;

wherein when the second rail is located at a predetermined position relative to the first rail and when the locking member is in a locking state, the locking member and the blocking feature are configured to block each other in order to prevent the second rail from being moved away from the predetermined position;

wherein the slide rail assembly further comprises a handle movable relative to the second rail; when the second rail is located at the predetermined position relative to the first rail and when the handle is moved from a first operating position to a second operating position, the handle is configured to drive one of the two operating members to move the locking member to switch from the locking state to an unlocking state in order to allow the second rail to be moved away from the predetermined position;

wherein the first rail comprises a supporting feature; wherein during the process of moving the handle from the first operating position to the second operating position, the handle is in contact with the supporting feature to drive the second rail to move away from the predetermined position along a predetermined direction.

* * * * *